United States Patent
Sotoudeh et al.

(10) Patent No.: US 12,341,596 B2
(45) Date of Patent: Jun. 24, 2025

(54) SYSTEM FOR SATELLITE COMMUNICATION

(71) Applicant: REQUTECH AB, Linköping (SE)

(72) Inventors: Omid Sotoudeh, Linköping (SE); Marcus Comstedt, Linköping (SE)

(73) Assignee: REQUTECH AB, Linköping (SE)

( * ) Notice: Subject to any disclaimer, the term of this patent is extended or adjusted under 35 U.S.C. 154(b) by 222 days.

(21) Appl. No.: 18/007,665

(22) PCT Filed: May 26, 2021

(86) PCT No.: PCT/EP2021/063984
§ 371 (c)(1),
(2) Date: Dec. 1, 2022

(87) PCT Pub. No.: WO2021/244908
PCT Pub. Date: Dec. 9, 2021

(65) Prior Publication Data
US 2023/0268985 A1    Aug. 24, 2023

(30) Foreign Application Priority Data

Jun. 2, 2020  (SE) .................................. 2030182-6

(51) Int. Cl.
*H04B 7/185*   (2006.01)
*H04W 36/00*   (2009.01)

(52) U.S. Cl.
CPC ....... *H04B 7/1851* (2013.01); *H04B 7/18541* (2013.01); *H04W 36/0083* (2013.01)

(58) Field of Classification Search
CPC .............. H04B 7/1851; H04B 7/18541; H04B 7/18508; H04B 17/309; H04W 36/0083;
(Continued)

(56) References Cited

U.S. PATENT DOCUMENTS

2004/0028016 A1 * 2/2004 Billhartz ............. H04L 63/1416
                                                        370/389
2007/0230643 A1   10/2007 Beadle et al.
(Continued)

FOREIGN PATENT DOCUMENTS

EP        0 748 084      12/1996
EP        3309976    *    4/2017
WO      2018/160842       9/2018

OTHER PUBLICATIONS

Asif Anwar, et al., "Military Satellite Terminals RF Technology Trends and Outlook", in: Microwave Journal, Aerospace and Defence Channel, Mar. 10, 2019, 9 pages.
(Continued)

*Primary Examiner* — Sung S Ahn
(74) *Attorney, Agent, or Firm* — NIXON & VANDERHYE

(57) ABSTRACT

A system for satellite communication including a plurality of nodes, each node including a ground terminal for communication with a satellite constellation, each ground terminal including a phased array antenna, each node being arranged to monitor a signal quality of a signal received by the ground terminal from the satellite constellation, the system being arranged to assign at most one node in the system to serve as a master node, the master node being arranged to obtain, for each node, the signal quality of the signal received by the ground terminal from the satellite constellation, assign, based on the signal quality, a node within the system to maintain communication with the satellite constellation, and hand over communication with the satellite constellation from a first node to a second node based on changes in the signal quality over time.

20 Claims, 3 Drawing Sheets

(58) Field of Classification Search
CPC ..... H04W 36/30; H04W 36/36; H04W 84/20; H01Q 21/06
See application file for complete search history.

(56) References Cited

U.S. PATENT DOCUMENTS

2008/0043663 A1    2/2008  Youssefzadeh et al.
2010/0142445 A1*   6/2010  Schlicht ................. H04W 4/23
                                                370/328
2012/0309422 A1*  12/2012  Lewis-Evans .......... G01S 19/48
                                                455/456.1

OTHER PUBLICATIONS

Pulak K. Chowdhury, et al., "Handover Schemes in Satellite Networks: State-of-the-Art and Future Research Directions", IEEE Communications Surveys & Tutorials @Bullet, 4th Quarter 2006, vol. 8, No. 4, Nov. 1, 2006, pp. 2-14 (13 pages).
Search Report for SE Application No. 2030182-6 dated Apr. 6, 2021, 2 pages.
International Search Report for PCT/EP2021/063984 dated Oct. 5, 2021, 4 pages.
Written Opinion of the ISA for PCT/EP2021/063984 dated Oct. 5, 2021, 7 pages.

* cited by examiner

SYSTEM FOR SATELLITE COMMUNICATION

CROSS-REFERENCE TO RELATED APPLICATIONS

This application is the U.S. national phase of International Application No. PCT/EP2021/063984 filed May 26, 2021 which designated the U.S. and claims priority to SE Patent Application No. 2030182-6 filed Jun. 2, 2020, the entire contents of each of which are hereby incorporated by reference.

TECHNICAL FIELD

The present disclosure relates to satellite communication, especially methods and systems for satellite connection handover between ground terminals.

BACKGROUND

In satellite communication, especially using satellites in medium Earth orbit (MEO) or low Earth orbit (LEO), handover of a connection to a satellite from one ground terminal to the next needs to be handled in a way that causes minimal disturbance of communications. Although methods for performing such handovers exist, improved systems and methods for managing connections between satellites and ground terminals can be developed.

SUMMARY

It is an object of the present disclosure to provide a system and method for improved handover in satellite communication.

This object is obtained by a system for satellite communication comprising a plurality of nodes, each node comprising a ground terminal for communication with a satellite constellation, each ground terminal comprising a phased array antenna. Each node is arranged to monitor a signal quality of a signal received by the ground terminal from the satellite constellation and the system is arranged to assign at most one node in the system to serve as a master node. Said master node is arranged to obtain, for each node, the signal quality of the signal received by the ground terminal from the satellite constellation, assign, based on the signal quality, one node within the system to maintain communication with the satellite constellation, and hand over communication with the satellite constellation from a first node to a second node based on changes in the signal quality over time.

Advantageously, monitoring the signal quality of the signal received for all nodes and using said signal quality to assign a node to maintain communication with the satellite constellation enables the system to maximize the signal quality.

According to aspects, the system may be arranged to assign one node to serve as master node based on the MAC address of the node. Advantageously, the assignment may be done in such a way as to ensure that a new master node is automatically assigned if the old master node is disconnected or if two systems each containing an assigned master node are connected to each other.

According to aspects, the nodes in the system may also be arranged to obtain an expected position of at least one satellite in the satellite configuration, obtain a position of the node and calculate, from the expected position of the at least one satellite and the position of the node, a relative position of the at least one satellite relative to the node. The nodes may further be arranged to steer the beam of the phased array antenna such that the main lobe points in the direction of the at least one satellite. Advantageously, this enables each node to maintain as high a signal quality as possible.

Optionally, the nodes in the system may be arranged in a mesh network. Advantageously, this facilitates communication between neighboring nodes.

According to aspects, the system may comprise mobile ground terminals. Advantageously, this enables use in applications relating to ground or air vehicles, or ships.

The object is also obtained by method in a system for communication with a satellite constellation, the system comprising a plurality of nodes, each node comprising a ground terminal for satellite communication, each ground terminal comprising a phased array antenna. The method comprises monitoring, by each node in the system, a signal quality of a signal received by the ground terminal of the node from the satellite constellation and assigning, by the system, a node to serve as master node. The method further comprises obtaining, by the master node, the signal quality of the signal received by the ground terminal from the satellite constellation for each node in the system, assigning, by the master node, one node within the system to maintain communication with the satellite constellation based on the signal quality, and handing over, by the master node, communication with the satellite constellation from a first node to a second node based on changes in the signal quality over time.

The method may also comprise assigning at least one node to serve as master node on the basis of the MAC address of the node.

According to aspects, the method may also comprise obtaining, by a node, an expected position of at least one satellite in the satellite configuration, and obtaining, by the node, a position of said node. The method may further comprise calculating, by the node, from the expected position of the at least one satellite and the position of the node, a relative position of the at least one satellite relative to the node and steering, by the node, the beam of the phased array antenna comprised in the node such that the main lobe points in the direction of the at least one satellite.

The methods disclosed herein are associated with the same advantages as discussed above in connection to the various systems.

The object is also obtained by a computer program for operating a system for communication with a satellite constellation, the computer program comprising computer code which, when run on processing circuitry of a system for communication with a satellite constellation, causes the system to execute a method as previously described, and by a computer program product comprising a computer program as described above, and a computer readable storage medium on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF DRAWINGS

The present disclosure will now be described more in detail with reference to the appended drawings, where.

DETAILED DESCRIPTION

Figure 1:
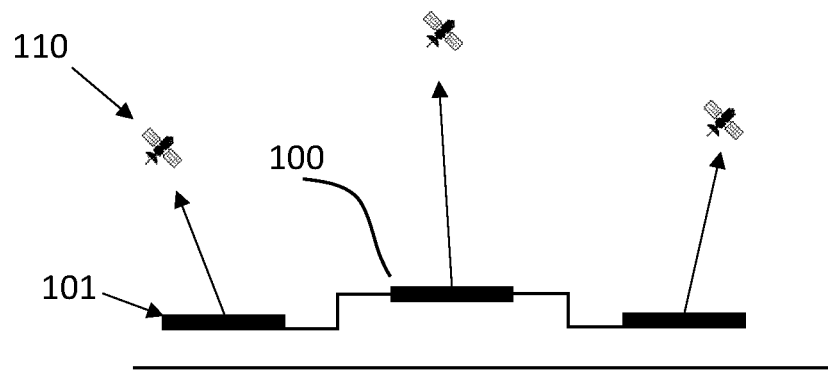
FIG. 1 shows a schematic of a system for communicating with a satellite constellation.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

When a system of ground terminals for satellite communication is maintaining a connection with a satellite or with a satellite constellation, handover of the connection to a satellite from one ground terminal to the next needs to be handled in a way that minimizes the risk that the connection will be broken. A connection, in this context, is understood to be in place when data can reliably be transferred between the satellite constellation and the system of ground terminals. At the same time, it is advantageous to always have the ground terminal that is currently able to achieve the best signal quality in the connection to the satellite maintain the active connection. Signal quality may for example be measured in terms of the signal to noise ratio, SNR.

In the present disclosure, the signal quality between the satellite constellation and each ground terminal in a system is monitored by a node in the system, and the ground terminal for which the signal quality is highest is selected to maintain the connection. Here, a node is a part of the system that comprises a ground terminal but may also comprise other parts, such as a modem, auxiliary positioning sensors or additional processing circuitry. The monitoring or master node can be any node in the system, ensuring a high degree of flexibility. A ground terminal is herein taken to mean an apparatus, constructed for use on Earth's surface, that is arranged to communicate with a satellite or with a satellite constellation. A ground terminal will generally comprise at least one antenna or antenna array and may comprise an antenna control unit (ACU). The ACU may be integrated in each of the terminals or be a central unit which all terminals are connected to and which decides on the appropriate terminal to operate at a certain time. In the first case, one ACU is then defined as master and will lead the other terminal ACU's which then are slaves.

In satellite communications, a satellite constellation generally refers to one or more satellites being used for a common purpose or as a group. As an example, a satellite constellation that is used for communications may employ a plurality of satellites to provide communications coverage over a larger area than could be covered by a single satellite.

FIG. 1 schematically shows a system 100 for satellite communication, comprising a plurality of nodes 101. Each node comprises a ground terminal 201 for communication with a satellite constellation 110. Each ground terminal 201 in turn comprises a phased array antenna 202. Each node is arranged to monitor a signal quality of a signal received by the ground terminal 201 from the satellite constellation 110. The system 100 is arranged to assign at most one node 101 to serve as a master node. Within the system, the nodes are connected to form a network. Monitoring of the signal quality may for example be performed by each ground terminal 201 following the satellite constellation on receive mode with received signal quality indication (RSSI) or a beacon receiver. Assignment of one node 101 to serve as master node may be done based on the MAC address of the node 101. A MAC address, or media access control address, is a unique identifier assigned to a network interface controller for use as a network address.

Optionally, assignment of a master node may be accomplished as follows. A node may broadcast a solicitation on the network for assuming the role of master node. If this solicitation is received by a node with a lower MAC address, that node will reply with a negative acknowledgement. If the soliciting node receives no such negative acknowledgement within a grace period, it assumes the role of master node. The node may also continue to broadcast such solicitations periodically after being assigned as master node. In a case where two separate systems with assigned master nodes are connected, this will automatically lead to the master node with a lower MAC address being assigned master node for both connected systems. Advantageously, this method allows automatic assignment of a master node as systems are connected or disconnected from each other.

The master node is arranged to obtain, for each node 101, the signal quality of the signal received by the ground terminal from the satellite constellation 110 and assign, based on the signal quality, one node 101 within the system 100 to maintain communication with the satellite constellation 110. This means that at each point in time, one node 101 is maintaining an active connection to the satellite constellation 110. This node 101 will be referred to as the active node.

The master node is also arranged to hand over communication with the satellite constellation 110 from a first node to a second node based on changes in the signal quality over time.

As an example, if the first node is maintaining communication with the satellite constellation 110 and the signal quality starts to decrease, while the signal quality increases for a second node, the master node may send deactivation messages to the first node and activation messages to the second node. Said messages include transfer of information required to provide a seamless handover between active nodes for a user system. The information may comprise encryption keys or session handles relating to ongoing data transfers to or from the user system. A user system, in this context, refers to any system external to the system for satellite communication 100 that is connected to, receives data from or provides data to be transmitted via the system for satellite communication 100. The second node will then become the active node in the network. This allows the system to maximize signal quality in the connection to the satellite constellation 110.

Optionally, the master node may hand over communication from the first to the second node when the signal quality of the first node drops below that of the second node, or when it drops below a threshold value. The master node may also hand over communication from the first to the second node when the signal quality of the first node falls below a threshold by more than a hysteresis value h, or the signal quality of the second node exceeds a threshold value by more than a hysteresis value. Hysteresis values and threshold hysteresis are well known in the art.

The satellite constellation 110 may comprise satellites in geostationary orbit (GEO), medium Earth orbit (MEO) or low Earth orbit (LEO).

Figure 2:
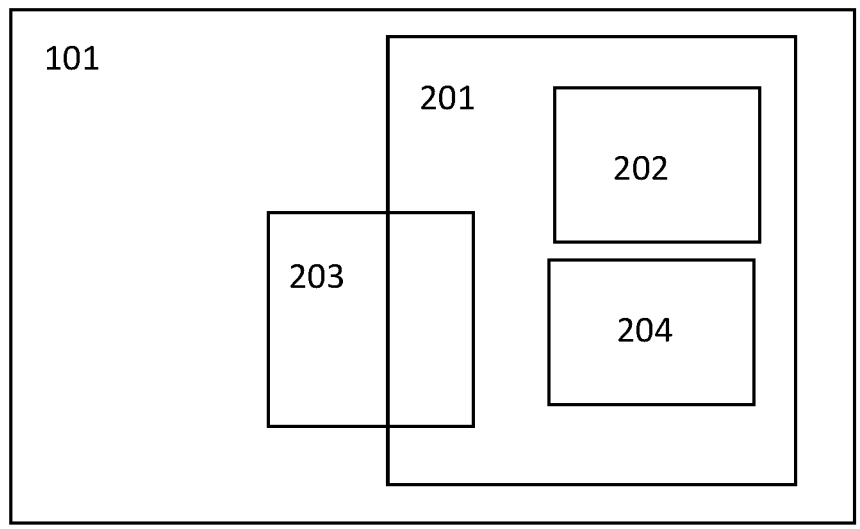
FIG. 2 is a block diagram of a node in a system for communicating with a satellite constellation.

FIG. 2 shows a block diagram of a node 101 in the system 100, comprising a ground terminal 201 for satellite communications. Said ground terminal in turn comprises a phased array antenna 202 and an antenna control unit 204. The ground terminal may also comprise a Modem 203 suitable for satellite communications. However, the Modem may also form part of the node 101 but be external to the ground terminal 201. When a node serves as master node, the operations necessary to obtain the signal quality, assign an active node, and manage handover of the active state between nodes may be performed either by the Modem 203 or the antenna control unit 204.

A phased array antenna 202 is an antenna array comprising a plurality of smaller antenna elements arranged to emit electromagnetic radiation in response to excitation with a signal. The signal being fed to the antenna elements can be given a different phase shift for each antenna element, which enables the main lobe or beam to be directed in a desired direction. This is known as beamforming or beam steering and is well known in the art.

Phased array antennas are generally designed for use for a range of frequencies of electromagnetic radiation, also known as a frequency band. As an example, the ground terminals 201 and phased array antennas 201 may be designed for use in the X, Ku, or K/Ka bands.

In order to improve signal quality, it is advantageous to know a relative position of the nodes in the system and the satellites in the satellite constellation. Within the system 100, nodes may therefore also be arranged to obtain an expected position of at least one satellite in the satellite configuration 110, obtain a position of the node 101, calculate, from the expected position of the at least one satellite and the position of the node 101, a relative position of the at least one satellite relative to the node and steer the beam of the phased array antenna 202 such that the main lobe points in the direction of the at least one satellite.

The network of nodes within the system may be a mesh network. The network of nodes may also be arranged to comprise two virtual networks, one mesh virtual network arranged to handle communication between nodes and one service virtual network arranged to forward satellite communication data. An external port on a node 101 can be in one of three states, inactive, part of both the mesh and the service network, or part of only the service network. When no cable is attached, the port is inactive. When a cable is attached, a probe packet is broadcast on the port. If this packet is received back on a different port, the port is returned to the inactive state. Otherwise, a second packet known as a mesh discovery multicast packet is transmitted. If a reply is received from an immediate neighbor, the port becomes part of both the mesh and the service network. Otherwise, it is only part of the service network.

In the context of the service network, the node that is assigned to be active by the master node will forward data traffic between the Modem 203 of the node and the service network. A special MAC address is assigned to the active node on the service network to facilitate seamless handover from the perspective of a user system. A node that is not active has its Modem 203 set to only receive data, in order to monitor signal strength and quality.

Satellite communications are also used in mobile applications, such as on ground vehicles, ships, or airborne vehicles. As such, the system 100 may also comprise mobile ground terminals.

Figure 3:
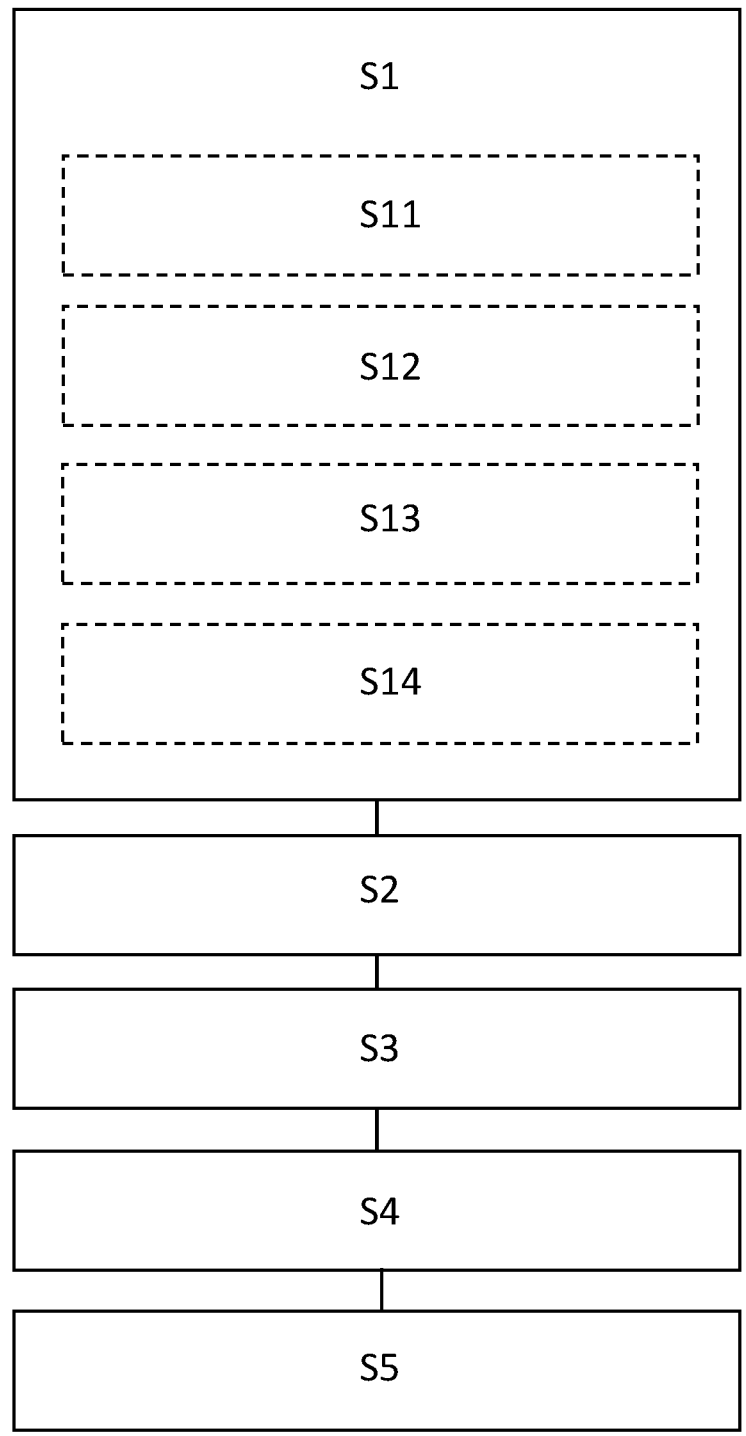
FIG. 3 is a flowchart describing the disclosed methods.

There is also herein disclosed a method, shown in FIG. 3, in a system 100 for communication with a satellite constellation 110, the system comprising a plurality of nodes 101, each node 101 comprising a ground terminal 201 for satellite communication, each ground terminal 201 comprising a phased array antenna 202. The method comprises monitoring S1, by each node 101 in the system, a signal quality of a signal received by the ground terminal 201 of the node 101 from the satellite constellation 110 and assigning S2, by the system 100, at least one node 101 to serve as master node. The method further comprises obtaining S3, by the master node, the signal quality of the signal received by the ground terminal 201 from the satellite constellation 110 for each node in the system, assigning S4 at most one node 101 within the system 100 to maintain communication with the satellite constellation 110 based on the signal quality, and handing over S5 communication with the satellite constellation 110 from a first node to a second node based on changes in the signal quality over time.

The method may also comprise assigning at least one node 101 to serve as master node on the basis of the MAC address of the node.

The method may also comprise obtaining S11, by a node 101, an expected position of at least one satellite in the satellite configuration 110, obtaining S12 a position of said node 101, calculating S13, from the expected position of the at least one satellite and the position of the node 101, a relative position of the at least one satellite relative to the node 101, and steering S14, the beam of the phased array antenna 202 comprised in the node 101 such that the main lobe points in the direction of the at least one satellite.

Figure 4:
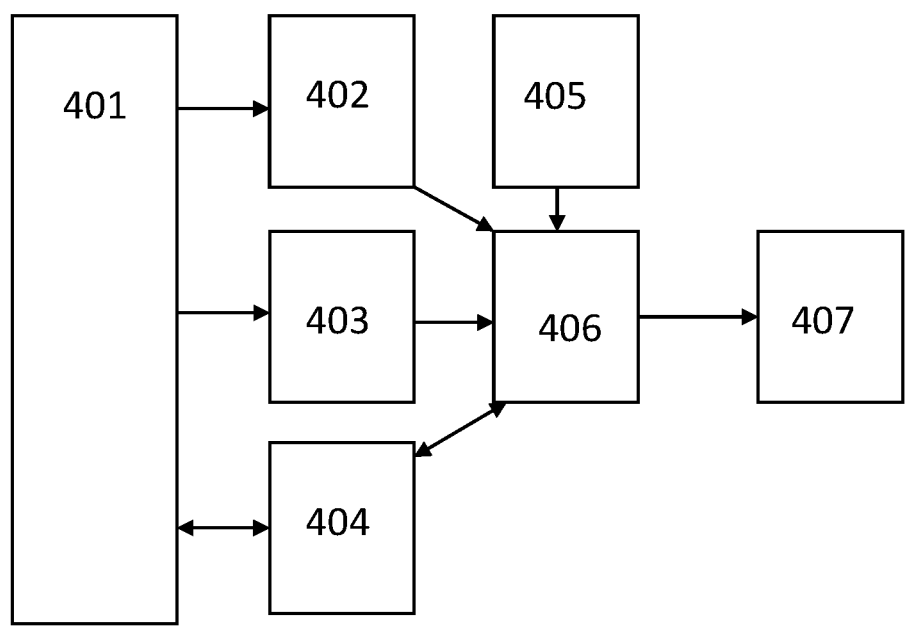
FIG. 4 is a block diagram describing functions in a computer program product.

FIG. 4 shows a block diagram of a possible implementation of the part of the method performed in the node as described above. The interface 401 to the MoDem 203 provides fixed orbital positions for GEO satellites or two-line element sets for MEO or LEO satellites. The interface 401 may also report signal composite power and signal to noise ratio of the signal from the satellite constellation 110. The interface may follow the OpenAMIP standard.

The functions 402 and 403 calculate the current coordinates of the at least one satellite in the satellite constellation 110 based on the fixed orbital position of a GEO satellite or based on two-line element sets for MEO or LEO satellites, respectively. The function 404 collects signal strength and quality information.

The function 405 provides information about the position and orientation of the node 101. This information may be obtained from RTK GPS receivers. Optionally, data from auxiliary sensors may be used. An auxiliary sensor may for example be an inertial sensor.

The tracking function 406 receives data from functions 402 to 405 and computes the position of the satellite relative to the node 101, producing a pointing vector in the direction from the node 101 to the satellite. Optionally, a search pattern may be used in order to find the optimum pointing vector. The tracking function 406 may comprise a Kalman filter.

The phase control function 407 receives the pointing vector from the tracking function 406 and calculates phase and gain adjustments for the antenna elements in the phased array antenna 202 that will result in the main lobe of the phased array antenna 202 pointing along the pointing vector.

A scenario involving the system and methods described above may be as follows. A system for satellite communication 100 comprising three nodes is set up. The node with the lowest MAC address is assigned as master node. The system for satellite communication 100 establishes a connection to a satellite in a satellite constellation 110 with a first node in the system as the active node. A data transfer is initiated comprising data from a user system external to the system for satellite communication 100. As the satellite moves relative to the nodes, the signal quality of the signal received by the first node from the satellite falls below that received by a second node, which until now has been in receive mode. The master node sends a deactivation message to the first node and an activation message to the second node, the activation message comprising information that allows the data transfer to and from the user system to continue without interruption as the handover is performed.

There is also herein disclosed a computer program for operating a system 100 for communication with a satellite constellation 110, the computer program comprising computer code which, when run on processing circuitry of a system for communication with a satellite constellation, causes the system to execute a method as described above. Furthermore, there is disclosed computer program product comprising a computer program as described above, and a computer readable storage medium on which the computer program is stored.

The invention claimed is:

1. A system for satellite communication comprising:
a plurality of nodes, each node comprising a ground terminal for communication with a satellite constellation, each ground terminal comprising a phased array antenna, each node being arranged to monitor a signal quality of a signal received by the ground terminal from the satellite constellation, the system being arranged to assign at most one node in the system to serve as a master node, said master node being arranged to:
obtain, for each node, the signal quality of the signal received by the ground terminal from the satellite constellation;
assign, based on the signal quality, a node within the system to maintain communication with the satellite constellation; and
hand over communication with the satellite constellation from a first node to a second node based on changes in the signal quality over time.

2. The system according to claim 1, wherein the system is arranged to assign a node to serve as master node based on the MAC address of the node.

3. The system according to claim 1, wherein the nodes are further arranged to
obtain an expected position of at least one satellite in the satellite configuration;
obtain a position of the node;
calculate, from the expected position of the at least one satellite and the position of the node, a relative position of the at least one satellite relative to the node; and
steer the beam of the phased array antenna such that the main lobe points in the direction of the at least one satellite.

4. The system according to claim 1, wherein the nodes are arranged in a mesh network.

5. The system according to claim 1, comprising mobile ground terminals.

6. A method in a system for communication with a satellite constellation, the system comprising a plurality of nodes, each node comprising a ground terminal for satellite communication, each ground terminal comprising a phased array antenna, the method comprising:
monitoring, by each node in the system, a signal quality of a signal received by the ground terminal of the node from the satellite constellation;
assigning, by the system, a single node to serve as master node;
obtaining, by the master node, the signal quality of the signal received by the ground terminal from the satellite constellation for each node in the system;
assigning, by the master node, one node within the system to maintain communication with the satellite constellation based on the signal quality; and
handing over, by the master node, communication with the satellite constellation from a first node to a second node based on changes in the signal quality over time.

7. The method according to claim 6, wherein assigning a node to serve as master node is performed on the basis of the MAC address of the node within the system.

8. The method according to claim 7, further comprising:
obtaining, by a node, an expected position of at least one satellite in the satellite configuration;
obtaining, by the node, a position of said node;
calculating, by the node, from the expected position of the at least one satellite and the position of the node, a relative position of the at least one satellite relative to the node; and
steering, by the node, the beam of the phased array antenna comprised in the node such that the main lobe points in the direction of the at least one satellite.

9. A non-transitory computer-readable medium on which is stored a computer program for operating a system for communication with a satellite constellation, the computer program comprising computer code which, when run on processing circuitry of a system for communication with a satellite constellation, causes the system to execute a method according to claim 6.

10. The system according to claim 2, wherein the nodes are further arranged to
obtain an expected: position of at least one satellite in the satellite configuration;
obtain a position of the node;
calculate, from the expected position of the at least one satellite and the position of the node, a relative position of the at least one satellite relative to the node; and
steer the beam of the phased array antenna such that the main lobe points in the direction of the at least one satellite.

11. The system according to claim 2, wherein the nodes are arranged in a mesh network.

12. The system according to claim 3, wherein the nodes are arranged in a mesh network.

13. The system according to claim 10, wherein the nodes are arranged in a mesh network.

14. The system according to claim 2, comprising mobile ground terminals.

15. The system according to claim 3, comprising mobile ground terminals.

16. The system according to claim 4, comprising mobile ground terminals.

17. The system according to claim 10, comprising mobile ground terminals.

18. The system according to claim 11, comprising mobile ground terminals.

19. The system according to claim 12, comprising mobile ground terminals.

20. The system according to claim 13, comprising mobile ground terminals.

* * * * *